Figure 1:
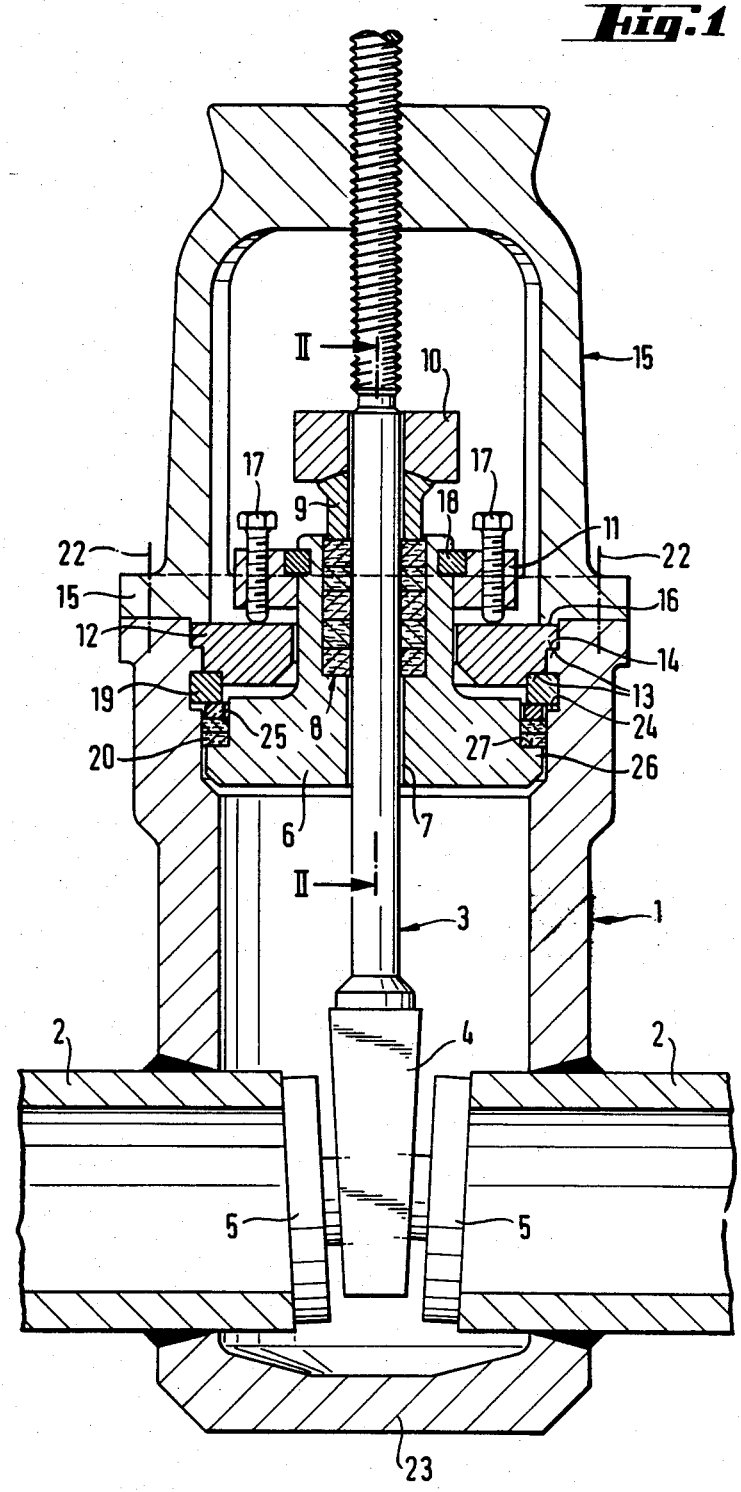

United States Patent [19]

Uomala et al.

[11] Patent Number: 4,500,092

[45] Date of Patent: Feb. 19, 1985

[54] VALVE COVER SEALING ARRANGEMENT

[75] Inventors: Vilho Uomala; Kjell Sandström; Jorma Matilainen, all of Pietarsaari, Finland

[73] Assignee: Oy Wartsila Ab, Helsinki, Finland

[21] Appl. No.: 479,340

[22] Filed: Mar. 28, 1983

[30] Foreign Application Priority Data

Apr. 7, 1982 [FI] Finland .................................. 821224

[51] Int. Cl.³ ...................... F16J 15/30; F16K 31/44; F16K 41/02
[52] U.S. Cl. ..................................... 277/12; 277/105; 277/112; 277/DIG. 6; 277/192; 251/214
[58] Field of Search .................... 277/12, 32, 102, 105, 277/106, 112, 116.4, 116.6, 192, DIG. 6; 251/214, 366, 367, DIG. 1

[56] References Cited

U.S. PATENT DOCUMENTS

| 347,277 | 8/1886 | Price et al. ...................... 277/102 X |
| 662,249 | 11/1900 | Cadman .......................... 277/105 X |
| 1,834,190 | 12/1931 | Timbs ............................. 277/105 X |
| 1,995,395 | 3/1935 | Mohr ............................... 277/112 X |
| 2,069,013 | 1/1937 | Nordstrom ..................... 277/105 X |
| 2,282,502 | 5/1942 | Suth ................................ 277/112 X |
| 3,540,740 | 11/1970 | Smith ............................. 277/105 X |
| 3,608,912 | 9/1971 | Templin et al. ................ 277/102 X |
| 4,068,853 | 1/1978 | Schnitzler ......................... 277/102 |
| 4,157,835 | 6/1979 | Kahle et al. ....................... 277/102 |
| 4,299,395 | 11/1981 | Reed ............................... 277/112 X |

FOREIGN PATENT DOCUMENTS

| 903742 | 6/1972 | Canada ................................ 277/102 |
| 926435 | 5/1973 | Canada ................................ 277/106 |
| 27700 | of 1902 | United Kingdom ................. 277/12 |
| 504521 | 4/1939 | United Kingdom ............... 277/112 |
| 753408 | 7/1956 | United Kingdom ............... 251/214 |
| 2055160 | 2/1981 | United Kingdom ............... 277/105 |

*Primary Examiner*—Robert S. Ward
*Attorney, Agent, or Firm*—John Smith-Hill

[57] ABSTRACT

A valve comprises a valve housing with a detachable cover, at least one sealing member between the housing and the cover and supporting means for compressing the sealing member and for keeping it in place. The sealing member is kept under a compression load between the cover and the valve housing. The sealing member material is elastically compressible at least 5%, preferably at least 10%.

7 Claims, 2 Drawing Figures

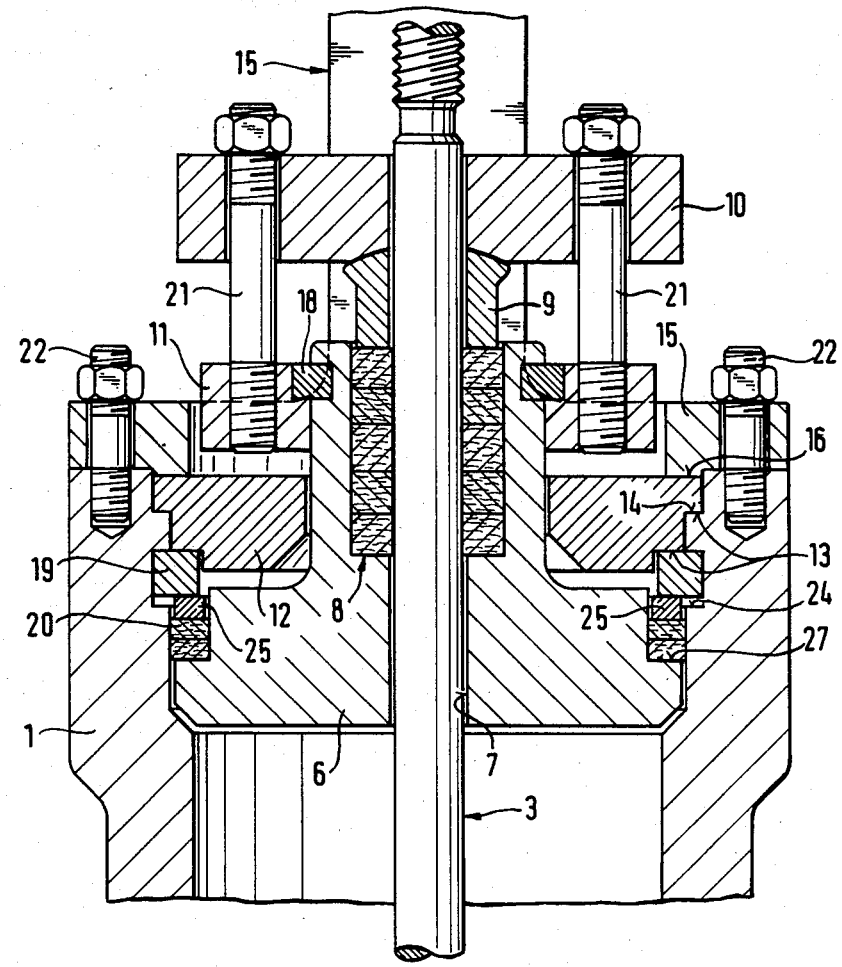

VALVE COVER SEALING ARRANGEMENT

The invention relates to a valve cover sealing arrangement.

In order to obtain, in a valve, a sufficient tightness between the valve housing and its cover, the sealing element of the cover has to be prestressed between adjacent elements. It is known to have the sealing element prestressed between the cover and a segmented ring, which is located in a groove in the valve housing. Between the ring and the groove there is a clearance allowing the ring to move in the groove in the prestress direction. In high pressure valves, the pressure inside the valve causes the cover to move relatively to the valve housing, and when the pressure is released, the cover moves back in the reverse direction. Thus, the cover sealing is exposed to a kind of pumping movement, which in the long run will damage the sealing.

It is also known to have the sealing prestressed directly against the valve housing. In known constructions of this kind a sealing material with limited yielding is used. Such a sealing material poorly withstands pressure and temperature fluctuations causing the cover to move in relation to the housing. The known structures are not suitable for high pressure valves, because the life time of the type of sealing conventionally used is short and its functional reliability is low.

Valve cover sealings are usually made from graphite or so-called white asbestos. The sealing can either be cut from sheet material or be made from bulk material, like fibers or powder by adding binding material and subsequent pressing. This kind of sealing withstands poorly the pumping movement referred to. Neither is a graphite covered white asbestos sealing, even if strenghtened by metallic threads or laminae, suitable as a high pressure valve cover sealing, because the material does not have sufficient elastic yielding properties.

The object of the invention is to provide a valve cover sealing arrangement, which is suitable for use in high pressure valves and which has a long service life and is reliable. Further, the structure has to remain tight also at high temperatures and when subject to great temperature or pressure fluctuations.

The characteristics of the invention are stated in claim 1. By prestressing the cover sealing between the valve cover and the valve housing, the sealing remains tight in spite of cover movements caused by pressure- and/or temperature fluctuations. By using a sealing made from compressible and elastic material, the elastic compressibility of which is at least 5%, preferably at least 10 or 20%, varying sealing conditions due to variations in the sealing clearance caused by thermal and pressure expansion will not cause leaks.

The valve cover is preferably provided with a radial, flange-like protrusion comprising a supporting surface acting on the sealing. The supporting surface is suitably perpendicular to the moving direction of the cover. The cover is adjustable in relation to the valve housing in the axial direction of the valve stem or spindle by means of a supporting member immovably attached to the valve housing, and force transmitting members acting between the supporting member and the cover. The adjustment of the cover presses the sealing tightly between the supporting surface of the cover and another supporting surface rigidly connected to the valve housing. This makes it easy to have the sealing properly prestressed.

In a preferred embodiment, the sealing is an annular graphite sealing, compressed to its mounting dimensions before fitting it into place. The sealing can be made from uniform tape-like graphite material, so that it comprises a plurality of radial layers. The compressing of the sealing can be carried out at a temperature of $-15°\ldots+40°$ C., preferably $+\ldots+28°$ C. and a pressure of $10\ldots250$ megapascal, preferably $50\ldots100$ megapascal. The compressing is carried out in a mould giving the sealing the desired shape. It this way the sealing is given a density exceeding 1500 kg/m$^3$. The density of a sealing wound from about 25 mm wide graphite tape is about 1600 kg/m$^3$, when the compressing pressure is about 50 megapascal. Correspondingly, a density of about 1800 kg/m$^3$ is obtained by using a pressure of 100 megapascal, when the composition of the sealing material includes about 99.9% graphite. In a sealing manufactured in this way, the different layers tend to form a homogenous mass. The elasticity of the sealing causes that the sealing adapts itself to the load, which gives an improved sealing effect.

The invention will now be described, by way of example, with reference to the accompanying drawing, in which FIG. 1 is a section of an embodiment of the invention,
FIG. 2 is section II—II of FIG. 1.

In the drawing, reference numeral 1 indicates a valve housing including inlet and outlet flow ducts 2 and a bottom portion 23. There is a valve stem 3 having at its bottom end 4 a valve member 5 movable to close and open flow duct 2. The application of the invention is not limited to the wedge-slide valve shown in the drawing, and it can be applied as well to a seat valve or even to a check valve without a stem. The vertical movement of stem 3 can be obtained either by rotating it in a stationary threaded bore or by rotating an axially stationary hand wheel or the like being in threaded connection with the stem. The movement mechanism of stem 3 is not shown in detail because it forms no part of the invention.

At the top of valve housing 1 there is a valve cover 6. Stem 3 passes through an opening 7 in cover 6. Between stem 3 and cover 6 there is a stem gasket 8, which is kept in place by a bushing 9 axially loaded by a support member 10 attached to cover 6 by means of bolts 21, an annular plate 11 and a locking ring 18 (FIG. 2). Annular plate 11 also works as a cover tightening means. Cover 6 is tightened in an upwards direction by means of screws 17 acting on a detachable supporting plate 12 having steps 13, of which at least one supports against a corresponding step 14 in valve housing 1. Supporting plate 12 is locked in its place by means of a step 16 in a yoke 15 attached to valve housing 1 by screws 22. Annular plate 11 is moved in relation to supporting plate 12 and in relation to body 1 by rotating bolts 17, thereby transmitting a lifting force to cover 6 via locking ring 18. There is a segmented ring 19 comprising at least two, usually four, segment portions in a groove 24 in valve housing 1. Cover 6 has a flange-like portion 26. Between the top surface 27 thereof and segment ring 19 there is a cover sealing 20. Between this sealing and segment ring 19 there is a metal ring 25, by means of which the load effects of the different segments of ring 19 are made more uniform. A prestress in sealing 20 is obtained by moving cover 6 upwardly in relation to valve housing 1, by means of screws 17.

Sealing 20 is formed, for instance, from wound and press shaped graphite tape. The layers of sealing 20 are one upon another in the radial direction of stem 3.

The invention is not limited to the embodiments shown, but several modifications thereof are feasible within the scope of the attached claims.

We claim:

1. A valve comprising a valve housing with a detachable cover, at least one sealing member between said housing and said cover and supporting means for compressing said sealing member and for keeping it in place, said sealing member being preformed to a form corresponding substantially to the form of said member under valve operation, said sealing member being kept under a compression load between said cover and said valve housing and being made of a material allowing elastic compression of said sealing member with at least 5%.

2. A valve according to claim 1, in which said sealing member is elastically compressible at least 10%.

3. A valve according to claim 1, in which said valve cover comprises a radial, flange-like protrusion having a support surface facing away from the interior of said valve housing and supporting said sealing member, said valve cover being, by means of loading means having a support at said valve housing, adjustable in a direction away from the interior of said valve housing in the axial direction of a valve stem or spindle passing through said cover.

4. A valve according to claim 1, in which said sealing member is a graphite annulus preformed by compression to its mounting form and dimensions before fitting it into place.

5. A valve according to claim 4, in which said sealing member is an annular member wound from tape-like graphite material by forming a plurality of radially disposed layers.

6. A valve according to claim 4, in which said sealing member has been precompressed to a density of at least 1500 kg/m$^3$.

7. A valve according to claim 6, in which said precompressing operation has been carried out with a pressure of 10–250 megapascal, preferably 50–100 megapascal.

* * * * *